UNITED STATES PATENT OFFICE.

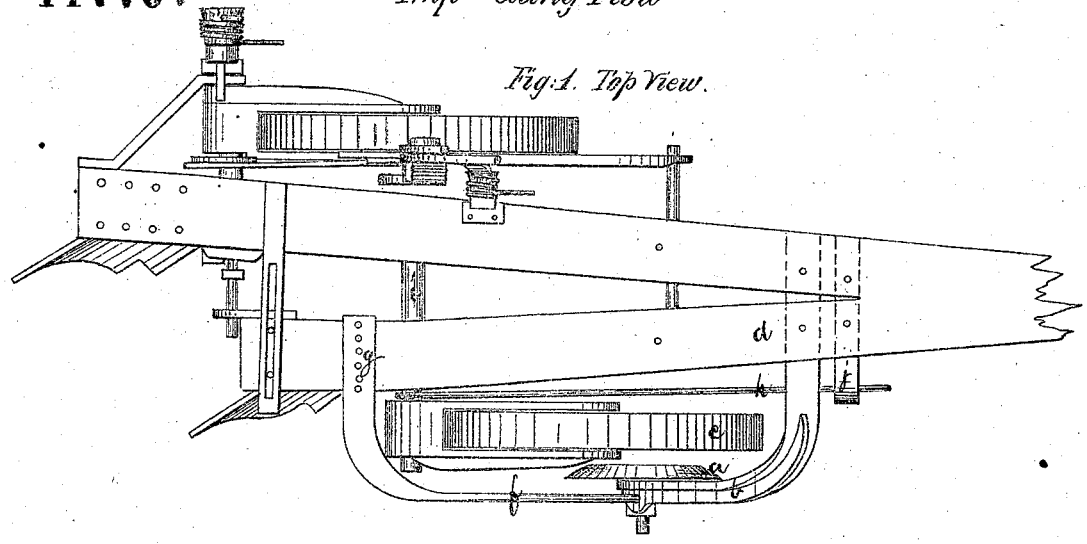
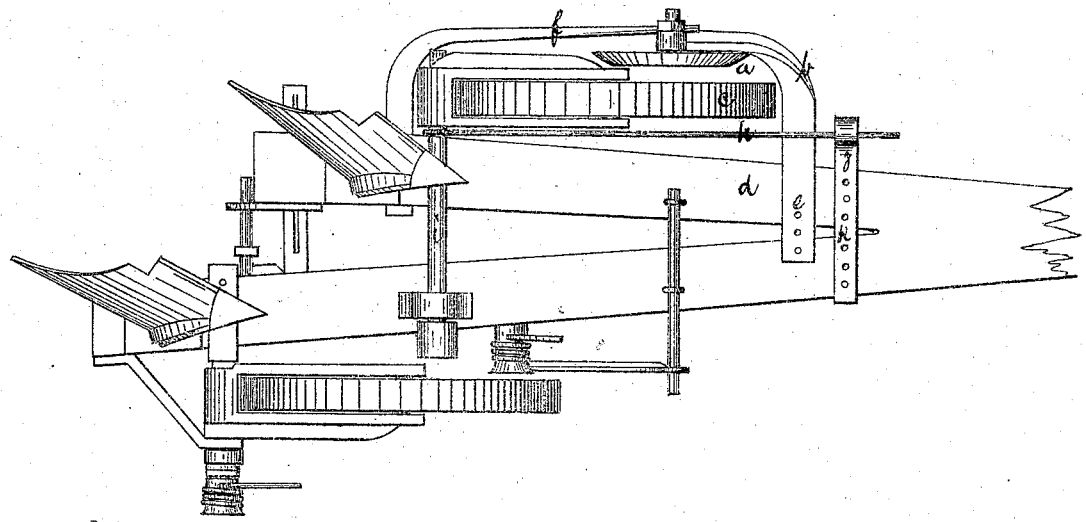

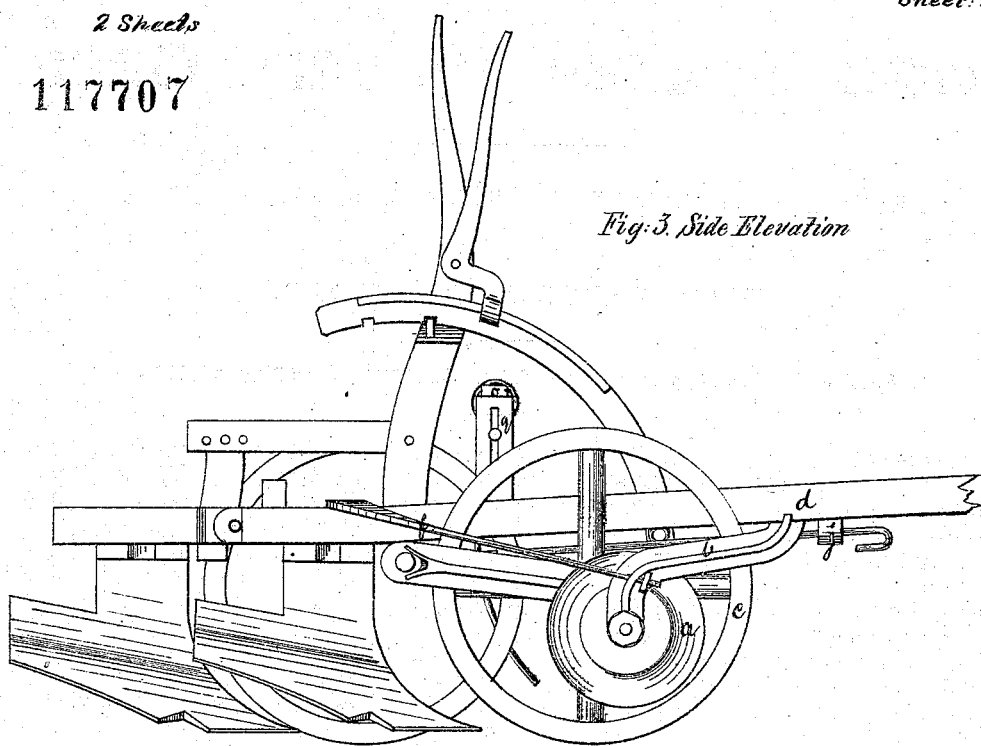
Fig. 3. Side Elevation
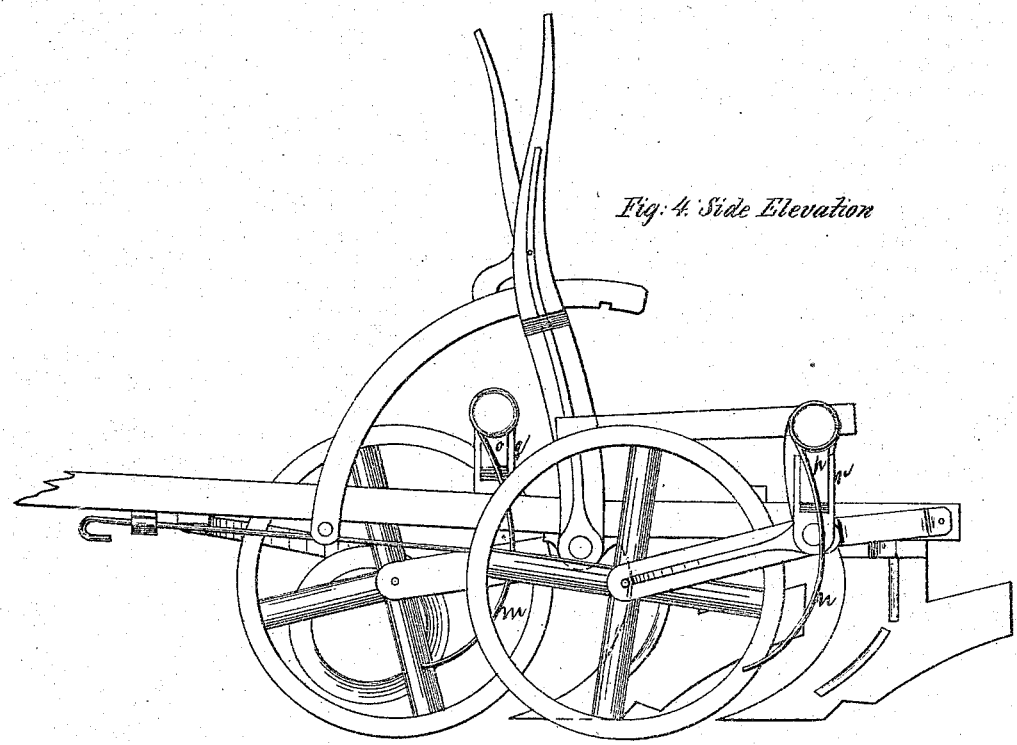
Fig. 4. Side Elevation

LEWIS T. WEBSTER, OF NORTHFIELD, MASSACHUSETTS.

IMPROVEMENT IN GANG-PLOWS.

Specification forming part of Letters Patent No. 117,707, dated August 1, 1871.

*To all whom it may concern:*

Be it known that I, LEWIS T. WEBSTER, of Northfield, in the county of Franklin and State of Massachusetts, have invented certain Improvements in Gang-Plows, of which the following is a specification:

The present invention is of the character of an additional improvement on a gang-plow on which Letters Patent numbered 100,696, and dated March 8, 1870, have heretofore been granted to me, the particular points of which improvements will here be fully set forth.

The accompanying drawing shows a plow with my improvements forming a part thereof, Figure 1 being a top view; Fig. 2, a bottom view; Fig. 3, a side elevation; and Fig. 4, another side elevation.

As in the main the plow here set forth is similar to that of the patent referred to, the parts additional only will be particularly set forth.

The furrow-guide $a$ is affixed to a crooked arm, $b$, which is carried forward of the wheel $c$ and attached to the under side of the beam $d$, and is movable or adjustable by a series of bolt-holes, $e$. The lower end of this arm $b$ is sustained by a brace, $f$, bolted to the rear end or near the rear end of said beam. The positions of the crooked arm and the brace are the reverse of their positions on the plow of the patent above referred to; and the end of the brace attached to the beam has a series of holes, $g$, for adjustment, as is the case with the front end of the curved arm as previously named. The furrow-guide $a$ is beveled, as is shown by Figs. 1 and 2, in use revolving and gauging the width of the furrow and taking the side draft of the plow. The draft-rod $h$, which passes around the shaft or axle $i$ and not movable laterally, and to which the double-tree is attached near its forward, end passes through and is supported by an arm, $j$, movable and adjustable by a series of bolt-holes, $k$, the inner end of the arm $j$ being in connection with the beam $d$, the object of this rod being to apply the draft to the center of resistance and run the plow to or from the land. The two wire springs $m$ and $n$ are made and attached, as quite fully shown by Fig. 4, one of which is carried forward of the colter of one plow, the other being carried outside and in the track of the colter of the other plow at the succeeding round. They may be raised or lowered by the arms $o$ and $p$ adjustable in the standards $q$ and $r$, as shown, to near the level of the ground, and, striking the elevations of the ground, are crowded back, and when released from pressure spring forward and throw off and forward all obstructions, thus preventing the plow from being clogged and keeping the colters clean and in good condition to do their work.

What I claim as an improvement on the plow of patent numbered 100,696 is—

1. The circular revolving beveled furrow-guide $a$, as herein shown and described, in combination with the adjustable arm $b$ and brace $f$, as recited.

2. The arrangement of the draft-rod $h$ in relation to the axle or shaft and beam, as and for the purpose set forth.

3. The arrangement of the adjustable springs $m$ and $n$ in relation to the plows, as described.

This specification signed this 12th day of May, 1871.

LEWIS T. WEBSTER.

Witnesses:
C. W. STEPENSON,
N. S. FIELD.